United States Patent Office 3,413,128
Patented Nov. 26, 1968

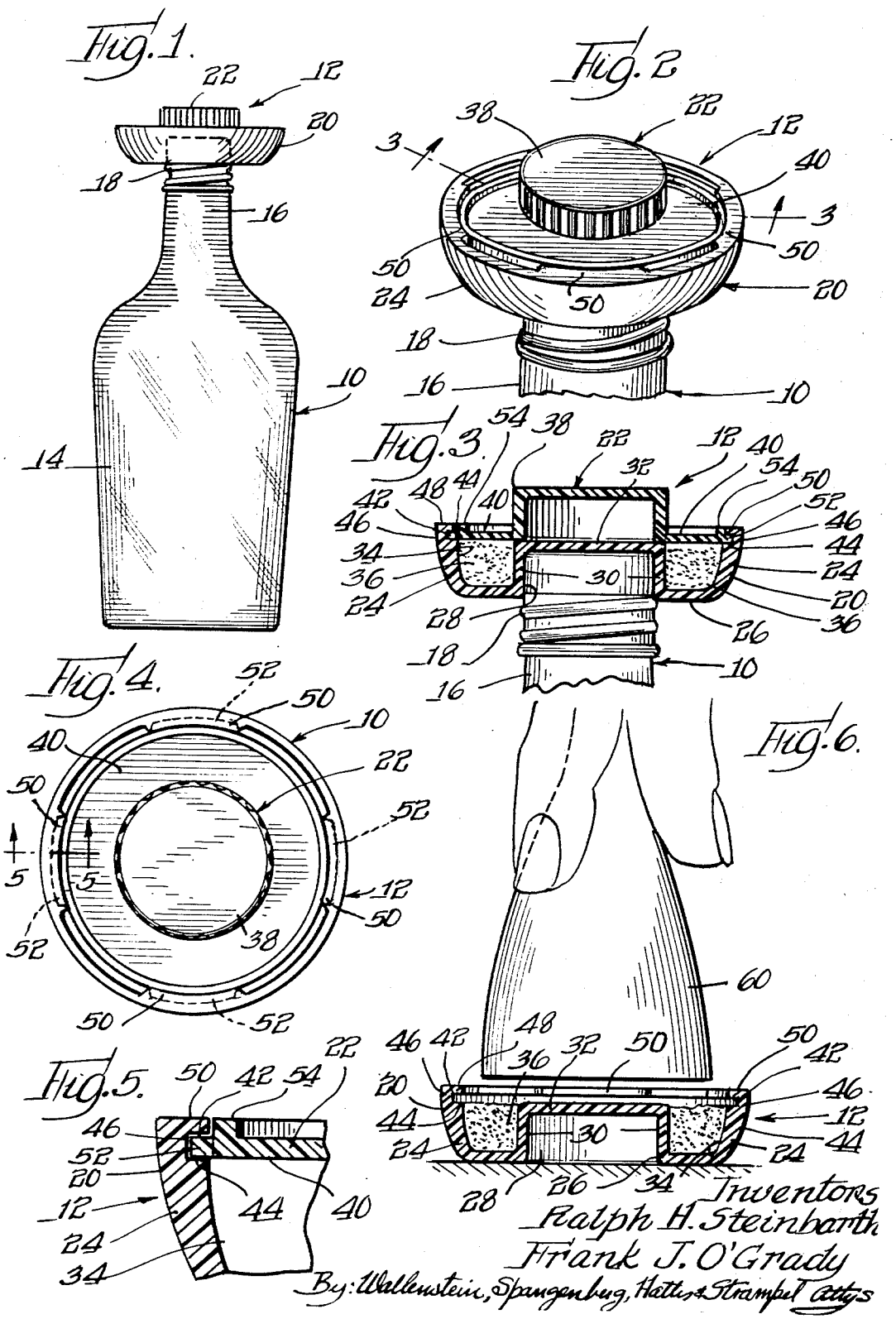

3,413,128
BOTTLE
Ralph H. Steinbarth, Chicago, and Frank J. O'Grady, Oak Lawn, Ill., assignors to La Preferida, Inc., Chicago, Ill., a corporation of Illinois
Filed May 8, 1967, Ser. No. 636,829
4 Claims. (Cl. 99—171)

ABSTRACT OF THE DISCLOSURE

A bottle comprising a first container and a second container. The first container is in the form of a glass bottle having an open-ended neck portion and a body portion for holding a liquid. A closure is provided for the first container. The second container is in removable engagement with the first container at the neck portion thereof, and comprises a body portion having compartment for holding a solid foodstuff which serves as an adjunct to the liquid in the first container. A removable cover is provided for the body portion of the second container. The compartment of the body portion of the second container is sufficient in size to enable the entire rim, or a portion thereof, of a cocktail glass, for example, to be brought into contact with the solid foodstuff in the compartment. The first container of the bottle, in its preferred form, is adapted to hold a tequila cocktail mix, while the second container is adapted to hold a salt, or salt mixture, used as an adjunct in drinking the tequila cocktail.

Background of the invention

Traditionally, a tequila cocktail such as a margarita cocktail, is served with salt. In serving the cocktail, the outside of the glass, near the rim, is first moistened. A small piece of a lime generally is used for this purpose. Common table salt, or more frequently a special tequila cocktail salt mixture, is thereafter sprinkled on the moistened area of the glass. An ordinary salt shaker commonly is used to dispense the salt. Apart from being cumbersome, time consuming and messy, it is difficult for even skillful bartenders to apply a uniform and adequate quantity of salt to a tequila cocktail glass by this practice. Furthermore, the salt dispenser constitutes a separate item which can be misplaced. In addition, the salt, especially the special mixture frequently used by tequila cocktail drinkers, must be purchased as a separate item thereby representing an added expense to the user.

Summary of the invention

In accordance with the present invention, there is provided a bottle having particular utility in connection with the sale and use of tequila cocktail mixes. Briefly, the bottle comprises a first container having an open-ended neck portion and a body portion for holding a quantity of a liquid such as a margarita cocktail mix. A closure, desirably in the form of a standard screw-on type cap, is provided for the open-end of the first container. The bottle has a second container adapted to be removably engaged on the first container at the neck portion thereof. The second container includes a main body portion having an open-topped salt-receiving compartment formed therein. A removable cover portion is provided for the second container to prevent the salt from being inadvertently spilled from the salt-receiving compartment during shipment or handling of the bottle, and to protect the salt from exposure to contaminants during storage of the bottle. The salt-receiving compartment of the second container advantageously is of a size and shape such as to enable the entire rim, or a portion thereof, of an empty drinking or cocktail glass to be brought into contact, as by inversion of the glass, with the salt contained in the compartment. The bottle of this invention is unique in that it provides an efficient, effective and economical means for tequila cocktail drinkers and dispensers to purchase, as a unit, a desired quantity of the liquor as well as an adequate supply of the salt used as an adjunct in drinking the liquor and, furthermore, to maintain the liquor and the salt supply conveniently together until the liquor in the bottle is exhausted. These, and other objects and advantages of the invention will become clear from the description to follow.

Brief description of the drawing

FIG. 1 is a side view in elevation of an embodiment of the bottle of the present invention;

FIG. 2 is a fragmentary view in perspective of the top portion of said embodiment of the bottle;

FIG. 3 is a vertical sectional view taken substantially along line 3—3 of FIG. 2;

FIG. 4 is a top plan view of said embodiment of the bottle;

FIG. 5 is an enlarged fragmentary vertical sectional view taken substantially along line 5—5 of FIG. 4; and FIG. 6 is a vertical sectional view of the salt containing receptacle of said embodiment of the bottle showing the rim of a drinking glass being dipped in the salt contained therein preparatory to pouring a cocktail from the first container into the glass.

Description of the preferred embodiment

Referring, now, in particular, to FIG. 1 of the drawing, the embodiment of the invention illustrated comprises a glass container 10 and an auxiliary or second container 12. The container 10 has a main body portion 14, for holding a measured quantity of, for example, a tequila cocktail mix, and open-ended, externally threaded neck portion 16. A threaded closure or cap 18 desirably is provided for the container 10. The container 10 and the cap 18 may be of standard construction and may vary in shape and size.

The auxiliary or second container 12 may be formed of wood, lightweight metal, plastic, or the like, and comprises a generally flattened, circular cup-shaped receptacle 20 and a cover portion 22. The receptacle 20 has an upwardly and outwardly extending side wall 24 joined at its base to a bottom wall 26. The bottom wall 26 is provided with a substantially cylindrical recess 28 formed by an upwardly extending side wall 30 and a substantially horizontal upper wall 32. The recess 28 is of a size such that it will snugly receive the upper portion of the cap 18 thereby to firmly maintain the second container 12 in position on the glass container 10. Other means, such, for example, as cooperating threads on the wall 30 and the exterior of the cap 18, may be used to maintain the second container 12 on the first container 10.

The upwardly extending walls 24 and 30, together with the bottom wall 26, form a circular, trough-like compartment 34 for receiving a quantity of a special salt 36, to be used as an adjunct with the cocktail mix in the glass container 10. The salt 36, generally speaking, is a dry, fine-flake salt which contains oil of lemon and lemon crystals. It is whitish in color and contains an anticaking agent. The circumference of the compartment advantageously is such that the entire rim, or only a portion thereof, of a cocktail glass of the type used in serving tequila cocktails can be dipped into the salt 36.

The cover portion 22 of the auxiliary or second container 12 desirably is shaped to give the container 12 the overall appearance of a sombrero or a Spanish hat, as shown. To achieve this effect the cover portion 12 has an upwardly extending, short cylindrical portion 38 which may be solid or hollow Joined to the base of the cylindrical portion 38 is a circular, horizontal wall 40 which is adapted to overlie the compartment 34 when the cover portion 12 is in engagement with the receptacle 20.

In the embodiment of the invention illustrated, a bayonet lock-like arrangement is employed to securely maintain the cover portion 12 on the receptacle 20. To this end, the upper end of the wall 24 of the receptacle 20 is provided with an inwardly facing annular recess or channel 42 defined by a lower wall 44, an upwardly extending wall 46 and an inwardly extending upper lip 48. The lip 48, at substantially equally spaced intervals along its outer periphery, has a plurality of inwardly extending projections 50, the function of which will become clear as the description proceeds.

The horizontal wall 40 of the cover portion 12 has a plurality of substantially equally spaced outwardly extending locking extensions 52 along its outer periphery which are adapted to be received in the annular recess or channel 42 and to underlie the projections 50 of the receptacle 20 thereby to lock the cover portion 12 in position on the receptacle. Inwardly of the extensions 52 of the wall 40, an upwardly extending continuous ridge 54 is provided on the wall 40 to act as a guide in engaging the locking extensions 52 with the projections 50. When the cover portion 22 is secured in position on the receptacle 20, the inner and outer ends of the horizontal wall 40 of the cover portion 22 engage the outer edge of the wall 32 and the outer edge of the wall 44 to provide a tight seal over the compartment 34 and thus prevent the salt 36 contained therein from being inadvertently spilled. While the embodiment of the invention illustrated employs a bayonet lock-like arrangement as described, it should be understood that the cover portion may be secured on the receptacle in various ways. Thus, for example, the periphery of the wall 40 and the wall 24 may be provided with cooperating threads whereby the cover portion can be locked on the receptacle.

As indicated, the bottle of the present invention is purchased as a unit with a supply of salt 36 in the compartment 34 of the second container 12. In utilizing the bottle, the second or salt-containing container 12 is first removed from the cap on the neck of the glass container 10. The cover portion 22 is then removed from the receptacle 20 to expose the salt 36 in the compartment 34. As best seen in FIG. 6, the rim of an empty cocktail glass 60, for example, is immersed in the salt 36. While an adequate quantity of the salt will adhere to the rim of a glass which has been exposed to the atmosphere, a thicker layer of the salt can be provided on the rim by first moistening, slightly, the rim and then dipping it in the salt. After applying the salt to the rim of the glass 60, the cap 18 is removed from the container 10 and a portion of the contents thereof is poured into the glass. When finished, the user need simply place the cap 18 on the container 10, replace the cover portion 22 on the receptacle 20, and secure the second container 12 on the glass container 10. The bottle can then be stored as a unit until it is again desired to use its contents.

While the bottle has been described with reference to its particular utility in connection with tequila cocktails, it should be understood that other solid foodstuffs such, for example, as nuts may be placed in the second container to serve as an adjunct to various other beverages and liquors contained in the first container. Therefore, no unnecessary limitations are to be read into the invention which have as their basis the nature of the solid foodstuff in the auxiliary or second container and the beverage or liquor in the glass container.

What is claimed is:

1. A composite container comprising, in combination, a bottle having a reduced, open-ended neck portion and a main body portion for holding a quantity of a beverage, a closure member removably engaged on the neck portion of the bottle, an auxiliary receptacle removably engaged on the closure member for holding a quantity of a solid foodstuff to be used as an adjunct to the beverage in the bottle, said auxiliary receptacle comprising a solid foodstuff retaining portion having an annular, trough-like compartment formed therein for holding a solid foodstuff, the annular, trough-like compartment having a diameter appreciably greater than that of the neck portion of the bottle and being of a size to enable the rim of a drinking glass of the cocktail type to be received therein, the bottom wall of the solid foodstuff retaining portion of the auxiliary receptacle being flattened and having a substantially cylindrical recess formed therein for engaging the closure member on the reduced neck portion of the bottle, and a removable cover for the solid foodstuff retaining portion of the auxiliary receptacle to prevent the solid foodstuff from being inadvertently spilled from the annular, trough-like compartment.

2. A composite container in accordance with claim 1, wherein the recess formed in the bottom wall of the solid foodstuff retaining portion of the receptacle extends inwardly of the compartment a distance such that the top wall of the recess abuts the removable cover of the solid foodstuff retaining portion thereby to maintain substantially equal distribution of the solid foodstuff in the compartment during handling and shipment of the composite container.

3. A composite container according to claim 1, wherein the removable cover for the solid foodstuff retaining portion has an upwardly extending, centrally disposed gripping portion to facilitate removal of the cover from and replacement thereof on said retaining portion.

4. A composite container according to claim 1, wherein the beverage in the bottle is a tequila cocktail mix and the solid foodstuff in the annular, trough-like compartment is a salt used as a flavoring adjunct with the tequila cocktail mix.

References Cited

UNITED STATES PATENTS

| | | | |
|---|---|---|---|
| 815,883 | 3/1906 | Van Blarcom | 215—6 |
| 2,028,489 | 1/1936 | Baker | 215—7 |
| 2,271,589 | 2/1942 | Hendrickson | 215—6 |
| 2,629,508 | 2/1953 | Prager | 215—6 |
| 2,766,796 | 10/1956 | Tupper | 215—6 |
| 2,824,010 | 2/1958 | Pedersen | 215—6 |
| 2,965,496 | 12/1960 | Serdar | 220—23 XR |
| 3,079,022 | 2/1963 | Thompkins | 215—6 |
| 3,085,709 | 4/1963 | Klein | 220—23 |

WILLIAM T. DIXSON, JR., *Primary Examiner.*